(12) United States Patent
Nagano et al.

(10) Patent No.: US 9,019,730 B2
(45) Date of Patent: Apr. 28, 2015

(54) POWER CONVERTING APPARATUS AND FILTER SWITCH

(75) Inventors: Sumiaki Nagano, Fukuoka (JP); Kazutaka Kishimoto, Fukuoka (JP); Makoto Kojyo, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 550 days.

(21) Appl. No.: 13/443,887

(22) Filed: Apr. 11, 2012

(65) Prior Publication Data
US 2012/0261187 A1  Oct. 18, 2012

(30) Foreign Application Priority Data

Apr. 18, 2011 (JP) .................................. 2011-091928

(51) Int. Cl.
*H02J 3/00* (2006.01)
*H02M 1/12* (2006.01)
*H02M 7/00* (2006.01)

(52) U.S. Cl.
CPC .............. *H02M 1/126* (2013.01); *H02M 7/003* (2013.01)

(58) Field of Classification Search
USPC .............. 363/34–37, 41; 361/679.01, 679.46, 361/679.48, 679.49, 688, 690, 695, 697, 361/702, 709, 711; 36/41
See application file for complete search history.

(56) References Cited

U.S. PATENT DOCUMENTS

| 6,320,776 B1 | 11/2001 | Kajiura et al. |
| 2010/0203762 A1* | 8/2010 | Donaldson et al. ...... 439/620.08 |

FOREIGN PATENT DOCUMENTS

| JP | 08-152142 | 6/1996 |
| JP | 3685391 B2 | 8/2000 |

OTHER PUBLICATIONS

Chinese Office Action for corresponding CN Application No. 201210088744.4, Apr. 2, 2014.
Japanese Office Action for corresponding JP Application No. 2011-091928, Jun. 12, 2013.

* cited by examiner

*Primary Examiner* — Adolf Berhane
*Assistant Examiner* — Afework Demisse
(74) *Attorney, Agent, or Firm* — Mori & Ward, LLP

(57) ABSTRACT

A power converting apparatus includes a switching element, a filter substrate, a housing, a main body, an air duct, and a filter switch. The switching element is configured to convert and output power. The filter substrate includes a filter circuit configured to reduce transmission of noise generated in the switching element to an input power source. The housing includes a housing base having a first surface and a second surface. The main body is on the first surface of the housing base, and includes the filter substrate and a plurality of electronic components. The air duct is disposed on the second surface of the housing base, and cooling air flows through the air duct. The filter switch is on the first surface of the housing base. The filter switch is configured to switch between making and breaking electrical conduction between the filter circuit and the housing.

15 Claims, 7 Drawing Sheets

POWER CONVERTING APPARATUS AND FILTER SWITCH

CROSS-REFERENCE TO RELATED APPLICATIONS

The present application claims priority under 35 U.S.C. §119 to Japanese Patent Application No. 2011-091928, filed Apr. 18, 2011. The contents of this application are incorporated herein by reference in their entirety.

BACKGROUND OF THE INVENTION

1. Field of the Invention

The present invention relates to a power converting apparatus and a filter switch.

2. Discussion of the Background

Japanese Patent No. 3685391 discloses a power converting apparatus that includes a switching element to convert and output power. This conventional power converting apparatus (power driving apparatus) includes a filter module having a filter substrate and an upper cover and a lower cover. The filter substrate has a filter circuit, and the upper cover and lower cover are respectively over and under the filter substrate, sandwiching the filter substrate. The filter module is attached to a heat radiating plate, which also serves as a grounded conductor, by sandwiching the filter substrate between the upper cover and the lower cover, passing conductive screws through attachment holes from the side of the rear surface (lower surface) of the power converting apparatus, and fitting the conductive screws into filter attaching posts. For applications in which the filtering function is not necessary, the attachment screws are loosened and the filter module is removed.

SUMMARY OF THE INVENTION

According to one aspect of the present invention, a power converting apparatus includes a switching element, at least one filter substrate, a housing, a main body, an air duct, and at least one filter switch. The switching element is configured to convert and output power. The at least one filter substrate includes a filter circuit configured to reduce transmission of noise generated in the switching element to an input power source. The housing includes a housing base having a first surface and a second surface. The main body is on the first surface of the housing base, and includes the at least one filter substrate and a plurality of electronic components. The air duct is disposed on the second surface of the housing base, and cooling air flows through the air duct. The at least one filter switch is on the first surface of the housing base. The at least one filter switch is configured to switch between making and breaking electrical conduction between the filter circuit and the housing.

According to another aspect of the present invention, a filter switch is disposed in a power converting apparatus. The power converting apparatus includes a switching element configured to convert and output power and configured to switch between making and breaking electrical conduction between a housing and a filter circuit. The filter circuit is configured to reduce transmission of noise generated in the switching element to an input power source. The filter switch includes a conductive screw and a nonconductive switch main body. The nonconductive switch main body includes at least two insertion holes through which the screw is configured to be inserted. The at least two insertion holes includes a first insertion hole and a second insertion hole. Through the first insertion hole, the screw is configured to be inserted with the filter circuit and the housing electrically conducted to one another. Through the second insertion hole, the screw is configured to be inserted with the filter circuit and the housing not electrically conducted to one another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
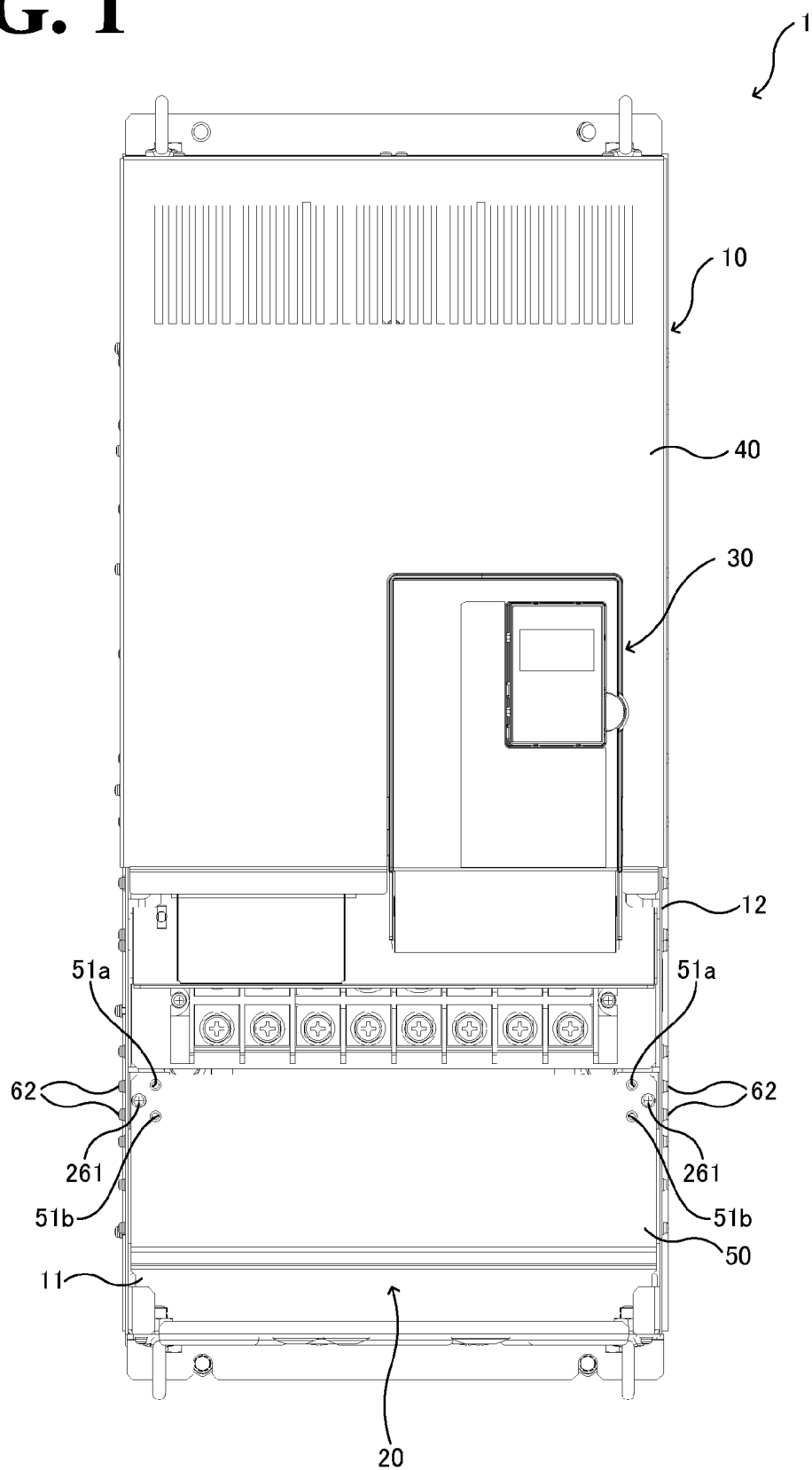
FIG. 1 is a plan view, on the front side, of a power converting apparatus according to an embodiment with a lower cover removed.

The embodiments will now be described with reference to the accompanying drawings, wherein like reference numerals designate corresponding or identical elements throughout the various drawings.

Figure 2:
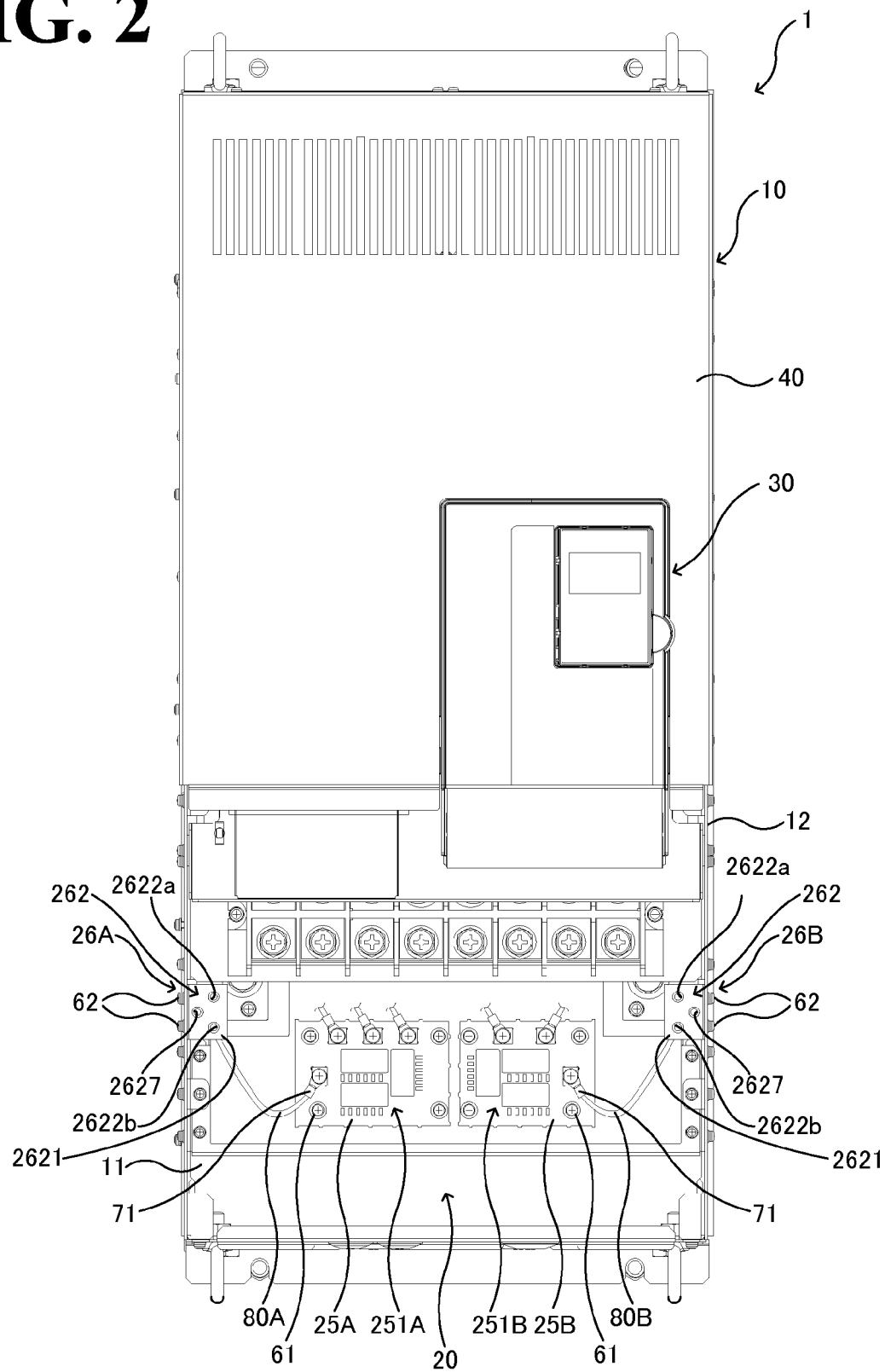
FIG. 2 is a plan view, on the front side, of the power converting apparatus with the lower cover and a filter cover removed.

As shown in FIGS. 1 and 2, a power converting apparatus 1 according to this embodiment includes a housing 10, a main body 20, an air duct, an operating unit 30, an upper cover 40, a lower cover, and a conductive filter cover 50. The housing 10 includes a housing base 11 and housing walls 12 upright on the front surface of the housing base 11 (in other words, on one surface of the housing base 11, as seen on the front side of the paper surface of each of FIGS. 1 and 2). The housing 10 serves as a grounded conductor. The main body 20 is disposed on the front surface of the housing base 11. The air duct, not shown, is disposed on the rear surface of the housing base 11 (in other words, on the other surface of the housing base 11, as seen on the rear side of the paper surface of each of FIGS. 1 and 2). Cooling air flows through the air duct. The operating unit 30 is disposed on the front surface of the housing base 11 and executes various operations. The upper cover 40 and the lower cover, not shown, cover the main body 20 on the front side (as seen on the front side of the paper surface of each of FIGS. 1 and 2), excluding the operating unit 30. The power converting apparatus 1 is in place with its main body 20 side (in other words, the front surface of the housing base 11) facing the front side while the air duct side (in other words, the rear surface of the housing base 11) facing the rear side.

Figure 3:
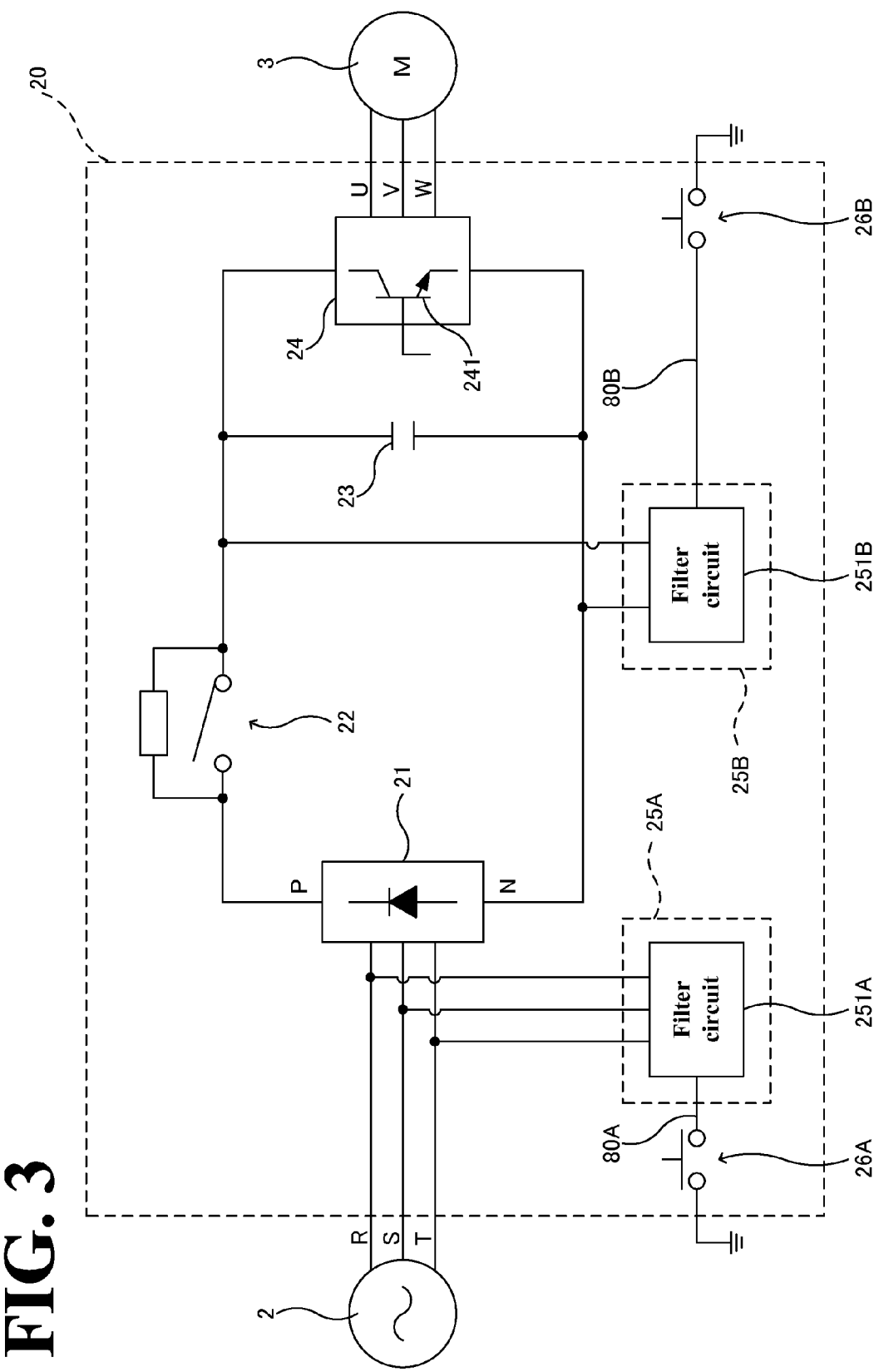
FIG. 3 is a diagram showing a plurality of electronic components disposed in a main body, illustrating an exemplary representation of how they are coupled to each other.
Figure 4:
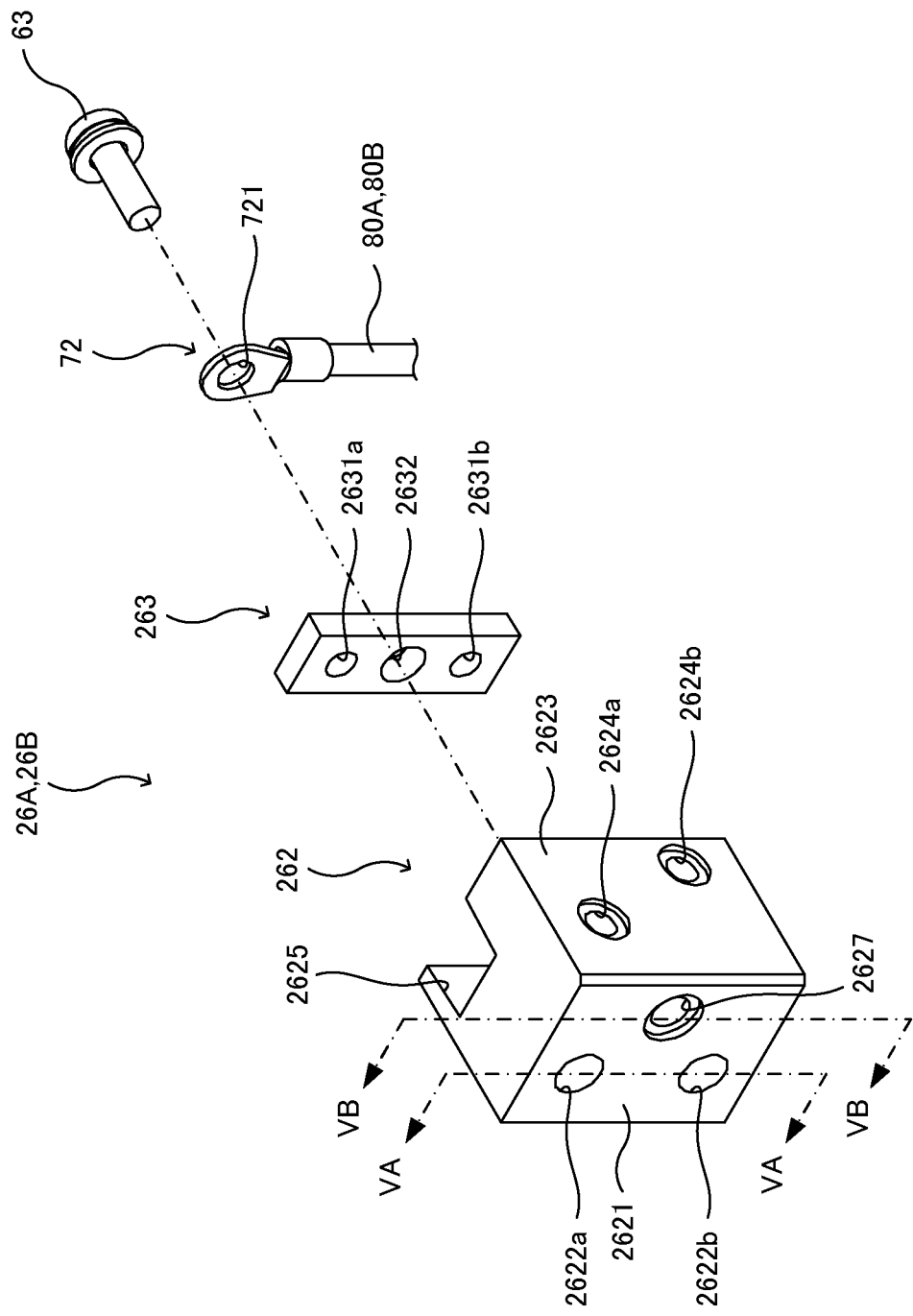
FIG. 4 is an exploded perspective view showing a switch main body of a filter switch, an earth plate, a compress-bonded terminal, and a screw.
Figure 5A:
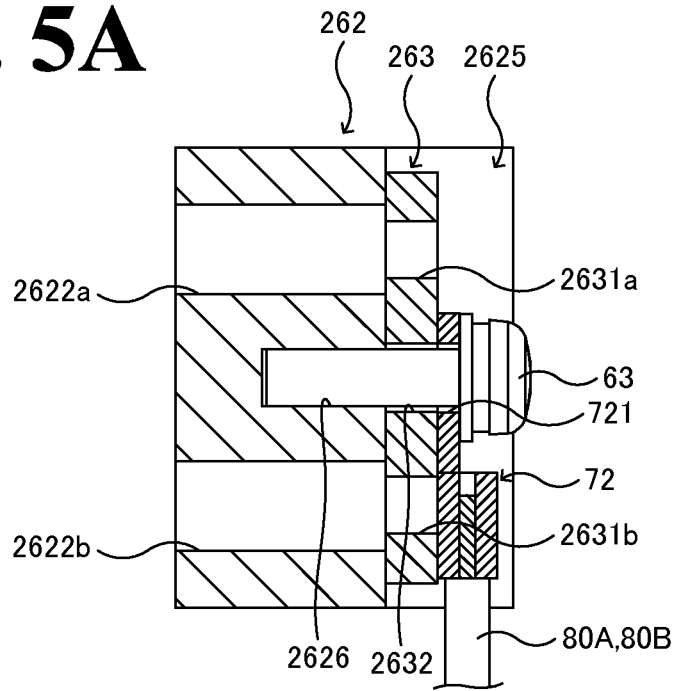
FIG. 5A is a longitudinal sectional view taken along the line VA-VA of FIG. 4.
Figure 5B:
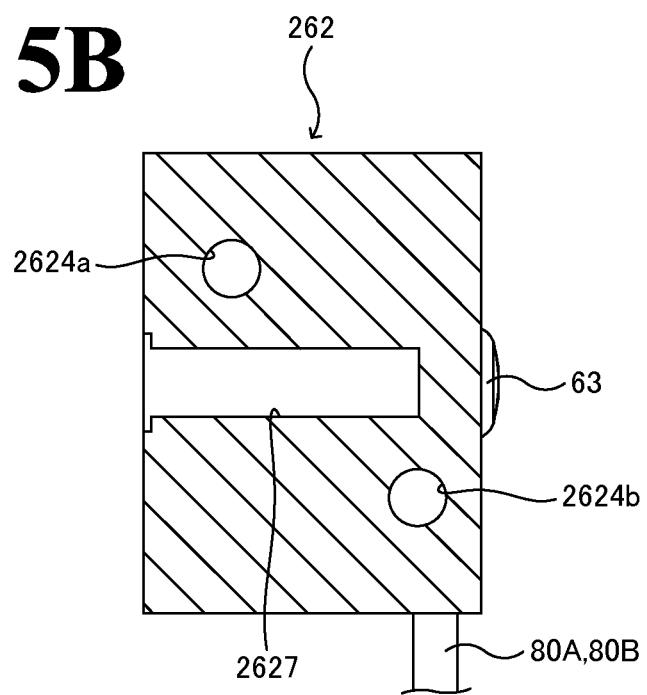
FIG. 5B is a longitudinal sectional view taken along the line VB-VB of FIG. 4.

As shown in FIGS. 2 and 3, the main body 20 includes a plurality of electronic components such as a diode module 21, an electromagnetic contactor 22, a main capacitor 23, a power module 24, two filter substrates 25A and 25B, and two filter switches 26A and 26B. The electromagnetic contactor 22 has a close/open controlled contact point.

The diode module 21 rectifies three-phase (R, S, and T phases) alternating current power supplied from an alternating current power source 2 (input power source), and outputs direct current power to two direct current buses P and N. The main capacitor 23 is coupled across the two direct current buses P and N so as to rectify the output power of the diode module 21. The power module 24, which converts and outputs power, includes a plurality of switching elements 241 (only one of which is shown in FIG. 3 for simplicity) each including a semiconductor device such as an IGBT (Insulated Gate Bipolar Transistor). The power module 24 is coupled to the two direct current buses P and N, through which direct current power is supplied to the power module 24. The plurality of switching elements 241 repeat conductions and shut-offs in respective appropriate orders so as to output three-phase (U, V, and W phases) alternating current power of predetermined frequencies to a motor 3.

On the front surface of the housing base 11, filter substrates 25A and 25B are disposed side by side in the lateral direction (in the lateral direction in FIG. 2), which is the width direction of the housing 10. The filter substrates 25A and 25B each have through holes, not shown, at four corners with four screws 61 disposed through the respective through holes, thus securing the filter substrates 25A and 25B to the front surface of the housing base 11. The filter substrates 25A and 25B each include a filter circuit 251. The filter circuit 251 has a filtering function of reducing transmission of noise generated in the switching elements 241 to the alternating current power source 2. In this embodiment, the filter substrate 25A is disposed to the left side (the left side in FIG. 2) of the housing 10 on the front surface of the housing base 11. The filter substrate 25A includes a filter circuit 251A, which is electrically coupled to the alternating current power source 2 and to the diode module 21 (in other words, the filter circuit 251A is disposed between the alternating current power source 2 and the diode module 21). The filter circuit 251A corresponds to the first filter circuit recited in the claims, and the filter substrate 25A, on which the filter circuit 251A is disposed, corresponds to the first filter substrate recited in the claims. The filter substrate 25B is disposed to the right side (the right side in FIG. 2) of the housing 10 on the front surface of the housing base 11. The filter substrate 25B includes a filter circuit 251B, which is electrically coupled to the diode module 21 and to the power module 24 (in other words, the filter circuit 251B is disposed between the diode module 21 and the power module 24). The filter circuit 251B corresponds to the second filter circuit recited in the claims, and the filter substrate 25B, on which the filter circuit 251B is disposed, corresponds to the second filter substrate recited in the claims.

On the front surface of the housing base 11, the filter switches 26A and 26B are disposed at both sides of the housing 10 in its lateral direction. The filter switch 26A switches between making and breaking electrical conduction between the filter circuit 251A and the housing 10, which serves as a grounded conductor, while the filter switch 26B switches between making and breaking electrical conduction between the filter circuit 251B and the housing 10. In this manner, the filtering function of the filter circuits 251A and 251B is switchable between active state and inactive state. In this embodiment, the filter switch 26A is disposed to the left side of the housing 10 on the front surface of the housing base 11. By switching between making and breaking electrical conduction between the filter circuit 251A and the housing 10, the filter switch 26A switches the filtering function of the filter circuit 251A between active state and inactive state. The filter switch 26A corresponds to the first filter switch recited in the claims. The filter switch 26B is disposed to the right side of the housing 10 on the front surface of the housing base 11. By switching between making and breaking electrical conduction between the filter circuits 251B and the housing 10, the filter switch 26B switches the filtering function of the filter circuit 251B between active state and inactive state. The filter switch 26B corresponds to the second filter switch recited in the claims. The filter switches 26A and 26B are of the same structure. Specifically, as shown in FIGS. 2, 4, 5A, 5B, 6A, and 6B, the filter switches 26A and 26B each include a conductive screw 261, a nonconductive switch main body 262, and a conductive earth plate 263 (plate). The switch main body 262, as a whole, is shaped in an approximately rectangular parallelepiped. The earth plate 263 is disposed on the switch main body 262.

The switch main body 262 has a surface 2621 shaped in an approximate rectangle, and a surface 2623. On the surface 2621, two first insertion holes 2622a and 2622b and a single second insertion hole 2627 are disposed. On the surface 2623, two screw holes 2624a and 2624b are disposed. On the surface (not shown) opposite the surface 2621, a depression 2625 is disposed to accommodate the earth plate 263. In the depression 2625 at the surface 2621 side, a screw hole 2626 is disposed. The second insertion hole 2627 is a blind hole and disposed at an approximately central position in the longitudinal direction of the surface 2621 (in the vertical direction in FIGS. 4, 5B, and 6B). The first insertion holes 2622a and 2622b are through holes and disposed at positions of the surface 2621 displaced from the position of the second insertion hole 2627 in the transverse direction of the surface 2621 (in the rear-left, front-right direction of FIG. 4). The first insertion holes 2622a and 2622b are mutually symmetrical in the longitudinal direction about the second insertion hole 2627. In the depression 2625 at the surface 2621 side, the screw hole 2626 is disposed at an approximately central position between the first insertion holes 2622a and 2622b.

The earth plate 263 is accommodated in the depression 2625 and closes the first insertion holes 2622a and 2622b. The earth plate 263 has two screw holes 2631a and 2631b respectively disposed at positions corresponding to the first insertion holes 2622a and 2622b, and has a through hole 2632 disposed at a position corresponding to the screw hole 2626. To the earth plate 263, a compress-bonded terminal 72 is attached. To the compress-bonded terminal 72, one end of a cable 80 is secured. The cable 80 has its another end electrically coupled to the filter circuit 251 via a compress-bonded terminal 71. The compress-bonded terminal 72 has a through hole 721 through which a screw 63 is disposed. The screw 63 through the through hole 721 is disposed through the through hole 2632 of the earth plate 263 and is screwed in the screw hole 2626 of the depression 2625. Thus, the compress-bonded terminal 72 is attached to the earth plate 263, and the earth plate 263 is attached to the switch main body 262. This makes the earth plate 263 electrically coupled to the filter circuit 251 via the compress-bonded terminal 72, the cable 80, and the compress-bonded terminal 71. In this embodiment, the compress-bonded terminal 72 attached to the earth plate 263 of the filter switch 26A is attached with one end of the cable 80A, which has its another end electrically coupled to the filter circuit 251A via the compress-bonded terminal 71. This makes the earth plate 263 electrically coupled to the filter circuit 251A via the compress-bonded terminal 72, the cable 80A, and the compress-bonded terminal 71. The compress-bonded terminal 72 attached to the earth plate 263 of the filter switch 26B is attached with one end of the cable 80B, which has its another end electrically coupled to the filter circuit 251B via the compress-bonded terminal 71. This makes the earth plate 263 electrically coupled to the filter circuit 251B via the compress-bonded terminal 72, the cable 80B, and the compress-bonded terminal 71.

The switch main bodies 262, each with the earth plate 263 electrically coupled to the corresponding filter circuit 251, are disposed at edges on both sides of the housing 10 in its lateral direction. In this respect, on the front surface of the housing base 11, the surface 2621 of each switch main body 262 is on the side of the front surface of the housing base 11 (in other words, the surface opposite surface 2621 is on the side of the rear surface of the housing base 11), while the surface 2623 is on the side of the outside surface of the housing 10 in its lateral direction. Two screws 62 are disposed through two insertion holes, not shown, of the housing wall 12, and respectively screwed in the screw holes 2624a and 2624b. Thus, the switch main bodies 262 are each secured to the inner wall of the housing wall 12. In this embodiment, the switch main body 262 of the filter switch 26A, with the earth plate 263 electrically coupled to the filter circuit 251A, is disposed on the front surface of the housing base 11 at the left side edge of the housing 10 with the surface 2621 on the side of the front surface of the housing base 11 and with the surface 2623 on the side of the left surface of the housing 10. The two screws 62 are disposed through the two insertion holes of the housing wall 12, and respectively screwed in the screw holes 2624a and 2624b. Thus, the switch main body 262 of the filter switch 26A is secured to the inner wall of the housing wall 12. The switch main body 262 of the filter switch 26B, with the earth plate 263 electrically coupled to the filter circuit 251B, is disposed on the front surface of the housing base 11 at the right side edge of the housing 10 with the surface 2621 on the side of the front surface of the housing base 11 and with the surface 2623 on the right side surface of the housing 10. The two screws 62 are disposed through the two insertion holes of the housing wall 12, and respectively screwed in the screw holes 2624a and 2624b. Thus, the switch main body 262 of the filter switch 26B is secured to the inner wall of the housing wall 12.

Thus, the switch main body 262 of each of the filter switches 26A and 26B has an approximately rectangular shape in a plan view on the side of the front surface of the housing base 11. In the plan view, the second insertion hole 2627 is disposed at an approximately central position in the longitudinal direction (the vertical direction in FIG. 2) of the switch main body 262. Also in the plan view, the first insertion holes 2622a and 2622b are mutually symmetrical in the longitudinal direction about the second insertion hole 2627, and displaced from the second insertion hole 2627 in the transverse direction (the lateral direction in FIG. 2) of the switch main body 262. Thus, in the plan view on the side of the front surface of the housing base 11, the switch main body 262 of each of the filter switches 26A and 26B is symmetrical in the transverse direction.

Figure 6A:
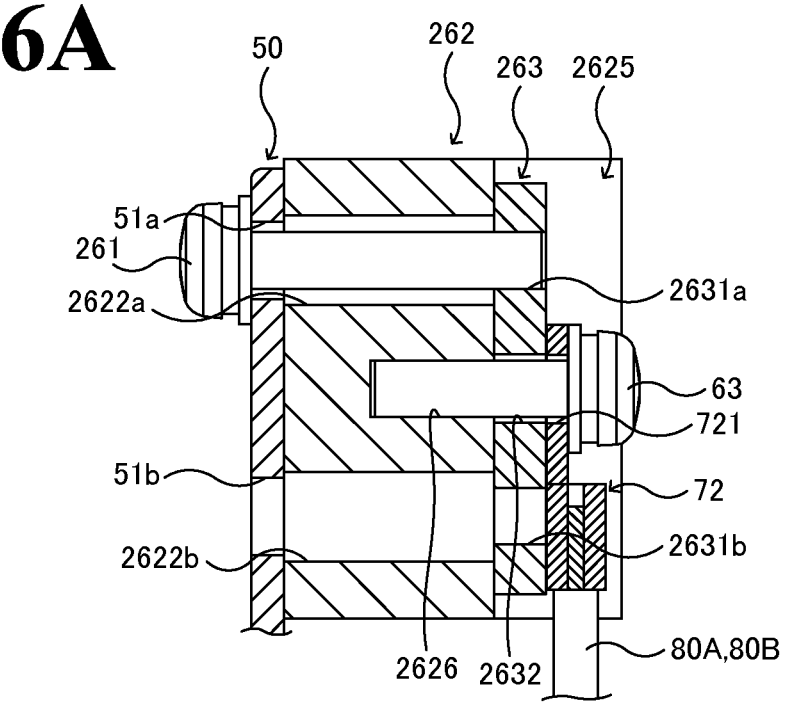
FIG. 6A is a longitudinal sectional view corresponding to the section VA-VA of FIG. 4 with a screw inserted into an insertion hole through a through hole of a filter cover.
Figure 6B:
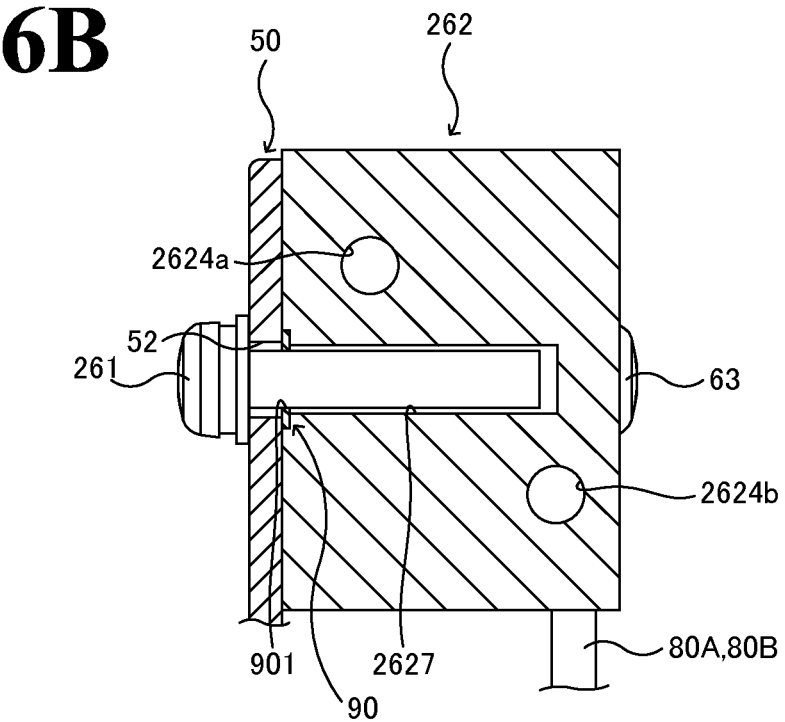
FIG. 6B is a longitudinal sectional view corresponding to the section VB-VB of FIG. 4 with a screw inserted into an insertion hole through a through hole of a filter cover.

The filter cover 50 is mounted to the housing 10 so as to cover the switch main bodies 262 of the filter switches 26A and 26B on the front side (in other words, on the front surface, as seen on the front side of the paper surface of FIG. 2 and on the left side in FIGS. 6A and 6B) and to cover the filter substrates 25A and 25B on the front side. As shown in FIGS. 1, 6A, and 6B, the filter cover 50 has three through holes 51a, 51b, and 52, through which the screw 261 is configured to be inserted. The through holes 51a, 51b, and 52 are disposed at positions corresponding to the first insertion holes 2622a and 2622b and the second insertion hole 2627 of the switch main body 262 of the filter switch 26A, and at positions corresponding to the first insertion holes 2622a and 2622b and the second insertion hole 2627 of the switch main body 262 of the filter switch 26B.

In this embodiment, the screw 261 is selectively inserted into one of the through holes 51a, 51b, and 52 disposed at the filter switch 26A side on the filter cover 50, thereby switching the filtering function of the filter circuit 251A between active state and inactive state. The screw 261 is selectively inserted into one of the through holes 51a, 51b, and 52 disposed at the filter switch 26B side on the filter cover 50, thereby switching the filtering function of the filter circuit 251B between active state and inactive state.

Specifically, when the screw 261 is inserted through the through hole 51a of the filter cover 50, the screw 261 is passed through the through hole 51a and through the first insertion hole 2622a of the switch main body 262, and screwed and secured in the screw hole 2631a of the earth plate 263. This makes the screw 261 coupled at one end to the housing 10 via the filter cover 50, and electrically coupled at another end to the filter circuit 251 via the earth plate 263 and other elements. Thus, the screw 261 is in place to make electrical conduction between the filter circuit 251 and the housing 10, activating the filtering function of the filter circuit 251 electrically coupled to the housing 10. When the screw 261 is inserted through the through hole 51b of the filter cover 50, the screw 261 is passed through the through hole 51b and through the first insertion hole 2622b of the switch main body 262, and screwed and secured in the screw hole 2631b of the earth plate 263. This makes the screw 261 coupled at one end to the housing 10 via the filter cover 50, and electrically coupled at another end to the filter circuit 251 via the earth plate 263 and other elements. Thus, the screw 261 is in place to make electrical conduction between the filter circuit 251 and the housing 10, activating the filtering function of the filter circuit 251 electrically coupled to the housing 10. When the screw 261 is inserted through the through hole 52 of the filter cover 50, the screw 261 is passed through the through hole 52 and through the second insertion hole 2627 of the switch main body 262, and screwed and secured in a screw hole 901 of a nut 90, which is disposed on the second insertion hole 2627. This makes the screw 261 coupled at one end to the housing 10 via the filter cover 50 and not coupled at another to the earth plate 263, making the screw 261 out of electrical coupling to the filter circuit 251. Thus, the screw 261 is in place to break electrical conduction between the filter circuit 251 and the housing 10, inactivating the filtering function of the filter circuit 251 cut off from the housing 10.

As has been described hereinbefore, the power converting apparatus 1 according to this embodiment includes the filter substrates 25A and 25B and the filter switches 26A and 26B. The filter substrates 25A and 25B respectively include the filter circuits 251A and 251B each configured to reduce transmission of noise generated in the switching elements 241 of the power module 24 to the alternating current power source 2. The filter switch 26A switches between making and breaking electrical conduction between the filter circuit 251A and the housing 10, which serves as a grounded conductor, while the filter switch 26B switches between making and breaking electrical conduction between the filter circuit 251B and the housing 10. When the filter switches 26A and 26B are closed to make electrical conduction between the filter circuits 251A and 251B and the housing 10, the filtering functions of the filter circuits 251A and 251B are activated. When the filter switches 26A and 26B are open to break electrical conduction between the filter circuits 251A and 251B and the housing 10, the filtering functions of the filter circuits 251A and 251B are inactivated.

Thus, the filtering function is switchable between active state and inactive state by the filter switches 26A and 26B. This significantly improves workability over, for example, the switching work of attaching and detaching the filtering device itself in accordance the necessity of the filtering function. Also in this embodiment, the filter switches 26A and 26B are disposed on the front surface of the housing base 11, and the power converting apparatus 1 is in place with its main body 20 side (in other words, the front surface of the housing base 11) facing the front side while the air duct side (in other words, the rear surface of the housing base 11) facing the rear side. Thus, when in place, the filter switches 26A and 26B are disposed on the front side of the power converting apparatus 1. This gives the worker facilitated access to the filter switches 26A and 26B, and further improves workability. Thus, this embodiment ensures facilitated switching of the filtering function between active state and inactive state.

It is particularly noted that in this embodiment, the filter switches 26A and 26B each include the conductive screw 261 and the nonconductive switch main body 262. The nonconductive switch main body 262 includes the three insertion holes 2622a, 2622b, and 2627, through which the screw 261 is configured to be inserted. Selectively inserting the screw 261 into one of the three insertion holes 2622a, 2622b, and 2627 ensures switching between making and breaking conduction between the filter circuits 251A and 251B and the housing 10. Additionally, all that is necessary for a worker in the switching work is a single screw driver, which further improves workability. Additionally, this switch configuration reduces the size and cost of the filter switches 26A and 26B.

It is particularly noted that in this embodiment, the switch main body 262 has the first insertion holes 2622a and 2622b and the second insertion hole 2627. The screw 261, when inserted through the first insertion hole 2622a or 2622b, is held in place to make electrical conduction between the housing 10 and the first insertion hole 2622a or 2622b. When inserted through the second insertion hole 2627, the screw 261 is held in place break electrical conduction between the housing 10 and the filter circuit 251A or 251B. Thus, selectively inserting the screw 261 into one of the first insertion holes 2622a and 2622b or into the second insertion hole 2627 facilitates switching of the filtering function between active state and inactive state. Additionally, when the filtering function is not in need, the screw 261 may be held in the second insertion hole 2627 so as to eliminate or minimize missing of the screw 261 and misuse of other screws.

It is particularly noted that in this embodiment, the filter cover 50 covers the switch main bodies 262 of the filter switches 26A and 26B on the front side and covers the filter substrates 25A and 25B on the front side. The filter cover 50 has the through holes 51a, 51b, and 52, through which the screw 261 is configured to be inserted, at positions corresponding to the first insertion holes 2622a and 2622b and the second insertion hole 2627 of the switch main body 262 of each of the filter switches 26A and 26B. This ensures switching of the filtering function between active state and inactive state with the filter cover 50 in place. This, in turn, ensures that the switching work is executed while protecting the switch main bodies 262 of the filter switches 26A and 26B and the filter substrates 25A and 25B. Additionally, the filter cover 50 need not be removed during the switching work, which eliminates or minimizes degradation of workability. Additionally, the conductive nature of the filter cover 50 coupled to the housing 10 enables the filter cover 50 to serve as a grounded conductor.

It is particularly noted that in this embodiment, the switch main body 262 of each of the filter switches 26A and 26B has two first insertion holes 2622a and 2622b. The screw 261, when inserted through any one of the first insertion holes 2622a and 2622b, is coupled to the housing 10 at one end via the filter cover 50 and screwed at another end in the screw hole 2631a or 2631b of the earth plate 263. Thus, the screw 261 is electrically coupled to the filter circuit 251A or 251B, resulting in electrical coupling between the housing 10 and the filter circuit 251A or 251B. This ensures that when activating the filtering function, the worker has a choice of either the first insertion hole 2622a or 2622b considering workability and the arrangement of the surrounding equipment. This provides a greater freedom of choice on where to dispose the screw 261. As an additional advantageous effect, the difference in number between the second insertion hole 2627 and the first insertion holes 2622a and 2622b provides clear indication of the different kinds of holes, and eliminates or minimizes erroneous insertion of the screw 261.

It is particularly noted that in this embodiment, the switch main body 262 of each of the filter switches 26A and 26B has an approximately rectangular shape in a plan view on the side of the front surface of the housing base 11. In the plan view, the second insertion hole 2627 is disposed at an approximately central position in the longitudinal direction of the switch main body 262. Also in the plan view, the two first insertion holes 2622a and 2622b are mutually symmetrical in the longitudinal direction about the second insertion hole 2627, and displaced from the second insertion hole 2627 in the transverse direction of the switch main body 262. Thus, in the plan view on the side of the front surface of the housing base 11, the switch main body 262 of each of the filter switches 26A and 26B is symmetrical in the transverse direction. When the power converting apparatus 1 includes two filter switches 26A and 26B disposed at the lateral sides of the housing 10, the two filter switches 26A and 26B face one another. In this respect, even when the two filter switches 26A and 26B are revolved by 180 degrees in the plan view on the side of the front surface of the housing base 11, approximately no change occurs to the above-described positional relationships between the first insertion holes 2622a and 2622b and between the second insertion hole 2627 and the first insertion holes 2622a and 2622b of each of the filter switches 26A and 26B. This eliminates or minimizes erroneous insertion of the screw 261 at each of the filter switches 26A and 26B.

It is particularly noted that in this embodiment, the power converting apparatus 1 includes the two filter circuits 251A and 251B. This adds to the reduction of transmission of noise generated in the switching elements 241 of the power module 24 to the alternating current power source 2. Additionally, the mutually independent, two filter circuits 251A and 251B are provided to respectively switch the filter switches 26A and 26B between active state and inactive state. This ensures that each of the filter switches 26A and 26B independently switches the filtering function between active state and inactive state in accordance with the application environment and

Figure 7:
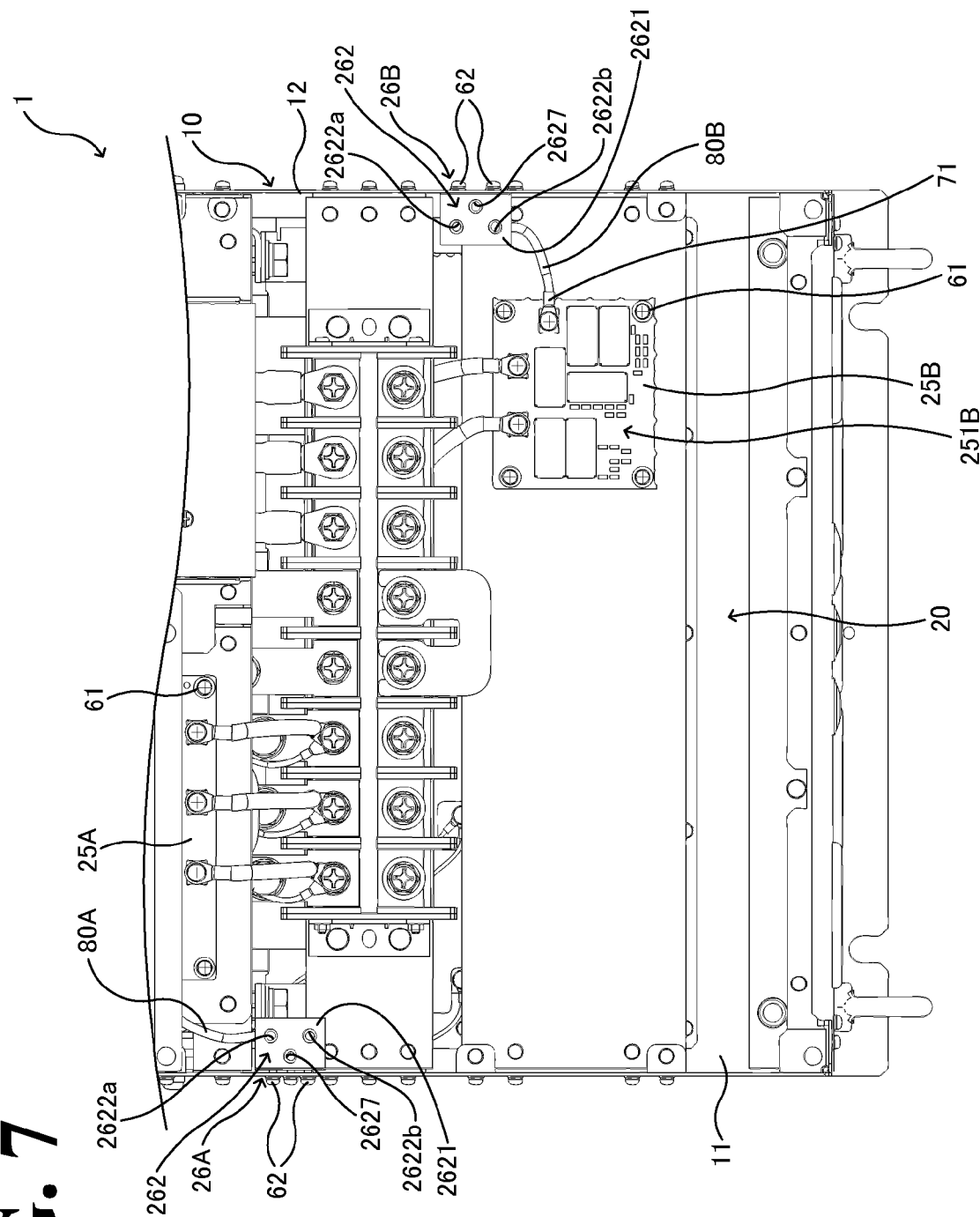
FIG. 7 is a plan view, on the front side, of a power converting apparatus with a lower cover removed, according to a modification in which a filter circuit is relocated in a direction along the length of a housing, and a filter switch is disposed adjacent the filter circuit.

(1) A Filter Circuit Relocated in a Direction Along the Length of the Housing, and a Filter Switch Disposed Adjacent the Filter Circuit As shown in FIG. 7, the filter substrate 25A according to this modification is relocated further upward in the vertical direction (to the upper side in FIG. 7), which corresponds to the length direction of the hosing 10, than the filter substrate 25A according to the above-mentioned embodiment. In accordance with the position of the filter substrate 25A according to this modification, the filter switch 26A according to this modification is relocated further upward in the vertical direction than the filter switch 26A according to the above-described embodiment. The filter switch 26A according to this modification is electrically coupled to the filter circuit 251A (not shown in FIG. 7 but in FIG. 2, for example), which is disposed on the filter substrate 25A via the cable 80A and other elements. This modification is otherwise similar to the above-mentioned embodiment.

Thus, when the filter substrate 25A with the filter circuit 251A is relocated in a direction along the length of the housing 10, the filter switch 26A electrically coupled to the filter circuit 251A via the cable 80A and other elements is also relocated in the direction along the length of the housing 10. This shortens the length of the cable 80A.

(2) Other Embodiments

While in the above-described embodiment the power converting apparatus 1 includes two filter switches 26A and 26B, this should not be construed in a limiting sense. The power converting apparatus 1 may include a single filter switch. Alternatively, the power converting apparatus 1 may include three or more filter switches.

While in the above-described embodiment the switch main body 262 of each of the filter switches 26A and 26B has two first insertion holes 2622a and 2622b, this should not be construed in a limiting sense. The switch main body 262 of each of the filter switches 26A and 26B may have a single first insertion hole.

While in the above-described embodiment the power converting apparatus 1 includes two filter substrates 25A and 25B, this should not be construed in a limiting sense. The power converting apparatus 1 may include a single filter substrate. Alternatively, the power converting apparatus 1 may include three or more filter substrates.

While in the above-described embodiment the alternating current power source 2 serves as the input power source, this should not be construed in a limiting sense. The input power source may be a direct current power source.

It will be appreciated that various embodiments and modifications described herein may be readily combined.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power converting apparatus comprising:
    a switching element configured to convert and output power;
    at least one filter substrate comprising a filter circuit configured to reduce transmission of noise generated in the switching element to an input power source;
    a housing comprising a housing base having a first surface and a second surface;
    a main body on the first surface of the housing base, the main body comprising the at least one filter substrate and a plurality of electronic components;
    an air duct through which cooling air flows on the second surface of the housing base; and
    at least one filter switch comprising a switch main body and a screw, the switch main body including at least two first insertion holes and at least one second insertion hole each being configured to receive the screw,
    wherein the at least one filter switch provides electrical conduction between the filter circuit and the housing when the screw is inserted within either of the at least two first insertion holes of the switch main body, and
    wherein the at least one filter switch does not provide electrical conduction between the filter circuit and the housing when the screw is inserted within the at least one second insertion hole of the switch main body.

2. The power converting apparatus according to claim 1, wherein
    the screw is a conductive screw, and
    the switch main body is a nonconductive switch main body.

3. The power converting apparatus according to claim 2, wherein the at least one filter substrate comprises
    a first filter substrate comprising a first filter circuit between the input power source and a diode module, and
    a second filter substrate comprising a second filter circuit between the diode module and a power module comprising the switching element,
    wherein the at least one filter switch comprises
    a first filter switch configured to switch between making and breaking electrical conduction between the first filter circuit and the housing, and
    a second filter switch configured to switch between making and breaking electrical conduction between the second filter circuit and the housing, and
    wherein the first filter switch and the second filter switch are disposed at sides of the housing in a width direction of housing on the first surface of the housing base.

4. The power converting apparatus according to claim 1, further comprising a conductive filter cover coupled to the housing and covering the switch main body and the at least one filter substrate on one side, the filter cover comprising through holes through which the screw is configured to be disposed, the through holes being at positions corresponding to the at least two first insertion holes and the at least one second insertion hole of the switch main body.

5. The power converting apparatus according to claim 4, wherein the at least two first insertion holes of the switch main body comprise two first insertion holes, and the at least one second insertion hole comprises a single second insertion hole, and
    wherein the at least one filter switch comprises a conductive plate on the switch main body so as to close the two first insertion holes, the conductive plate comprising two screw holes each configured to receive the screw through one of the two first insertion holes, the conductive plate being electrically coupled to the filter circuit.

6. The power converting apparatus according to claim 5,
wherein the switch main body has an approximately rectangular shape in a plan view on a side of the first surface of the housing base,
wherein in the plan view, the second insertion hole is disposed at an approximately central position in a longitudinal direction of the switch main body, and
wherein in the plan view, the two first insertion holes are mutually symmetrical in the longitudinal direction about the second insertion hole, and displaced from the second insertion hole in a transverse direction of the switch main body.

7. The power converting apparatus according to claim 5,
wherein the at least one filter substrate comprises
a first filter substrate comprising a first filter circuit between the input power source and a diode module, and
a second filter substrate comprising a second filter circuit between the diode module and a power module comprising the switching element,
wherein the at least one filter switch comprises
a first filter switch configured to switch between making and breaking electrical conduction between the first filter circuit and the housing, and
a second filter switch configured to switch between making and breaking electrical conduction between the second filter circuit and the housing, and
wherein the first filter switch and the second filter switch are disposed at sides of the housing in a width direction of housing on the first surface of the housing base.

8. The power converting apparatus according to claim 6,
wherein the at least one filter substrate comprises
a first filter substrate comprising a first filter circuit between the input power source and a diode module, and
a second filter substrate comprising a second filter circuit between the diode module and a power module comprising the switching element,
wherein the at least one filter switch comprises
a first filter switch configured to switch between making and breaking electrical conduction between the first filter circuit and the housing, and
a second filter switch configured to switch between making and breaking electrical conduction between the second filter circuit and the housing, and
wherein the first filter switch and the second filter switch are disposed at sides of the housing in a width direction of housing on the first surface of the housing base.

9. The power converting apparatus according to claim 4,
wherein the at least one filter substrate comprises
a first filter substrate comprising a first filter circuit between the input power source and a diode module, and
a second filter substrate comprising a second filter circuit between the diode module and a power module comprising the switching element,
wherein the at least one filter switch comprises
a first filter switch configured to switch between making and breaking electrical conduction between the first filter circuit and the housing, and
a second filter switch configured to switch between making and breaking electrical conduction between the second filter circuit and the housing, and
wherein the first filter switch and the second filter switch are disposed at sides of the housing in a width direction of housing on the first surface of the housing base.

10. The power converting apparatus according to claim 1,
wherein the housing serves as a grounded conductor electrically connected to the filter circuit when the screw is inserted within either of the at least two first insertion holes.

11. The power converting apparatus according to claim 1,
further comprising a conductive cover including at least two first through holes and at least one second through hole,
wherein the at least two first through holes align with the at least two first insertion holes of the switch main body, respectively, and
wherein the at least one second through hole aligns with the at least one second insertion hole of the switch main body.

12. A power converting apparatus comprising:
a switching element configured to convert and output power;
at least one filter substrate comprising a filter circuit configured to reduce transmission of noise generated in the switching element to an input power source;
a housing comprising a housing base having a first surface and a second surface;
a main body on the first surface of the housing base, the main body comprising the at least one filter substrate and a plurality of electronic components;
an air duct through which cooling air flows on the second surface of the housing base; and
at least one filter switch on the first surface of the housing base, the at least one filter switch being configured to switch between making and breaking electrical conduction between the filter circuit and the housing,
wherein the at least one filter substrate comprises
a first filter substrate comprising a first filter circuit between the input power source and a diode module, and
a second filter substrate comprising a second filter circuit between the diode module and a power module comprising the switching element,
wherein the at least one filter switch comprises
a first filter switch configured to switch between making and breaking electrical conduction between the first filter circuit and the housing, and
a second filter switch configured to switch between making and breaking electrical conduction between the second filter circuit and the housing, and
wherein the first filter switch and the second filter switch are disposed at sides of the housing in a width direction of the housing on the first surface of the housing base.

13. A filter switch disposed in a power converting apparatus, the power converting apparatus comprising a switching element configured to convert and output power and configured to switch between making and breaking electrical conduction between a housing and a filter circuit, the filter circuit being configured to reduce transmission of noise generated in the switching element to an input power source,
the filter switch comprising:
a conductive screw; and
a nonconductive switch main body comprising at least two first insertion holes and at least one second insertion hole through which the screw is configured to be inserted, wherein:
the at least two first insertion holes are each configured to receive the screw through which the filter circuit and the housing are electrically conducted to one another; and the at least one second insertion hole through is configured to receive the screw though which the filter circuit and the housing are not electrically conducted to one another.

14. The filter switch according to claim 13, wherein the housing serves as a grounded conductor electrically connected to the filter circuit when the screw is inserted within either of the at least two first insertion holes.

15. The filter switch according to claim 13, further comprising a conductive cover including at least two first through holes and at least one second through hole,
wherein the at least two first through holes align with the at least two first insertion holes of the nonconductive switch main body, respectively, and
wherein the at least one second through hole aligns with the at least one second insertion hole of the nonconductive switch main body.

\* \* \* \* \*